United States Patent [19]

Riley et al.

[11] 4,443,172

[45] Apr. 17, 1984

[54] METHODS OF AND APPARATUS FOR MAKING CATHODE ELECTRODES FOR SODIUM SULPHUR CELLS

[75] Inventors: David J. Riley, Chester; Gerald McGreavy, Bolton, both of England

[73] Assignee: Chloride Silent Power Limited, London, England

[21] Appl. No.: 324,922

[22] Filed: Nov. 25, 1981

[30] Foreign Application Priority Data

Dec. 2, 1980 [GB] United Kingdom ............... 8038627

[51] Int. Cl.³ ........................................... H01M 4/04
[52] U.S. Cl. ................................... 425/112; 425/125; 425/129 R; 425/143; 425/144; 425/552; 264/104
[58] Field of Search ............... 425/552, 125, 129 R, 425/143, 144, 112; 264/328.7

[56] References Cited

U.S. PATENT DOCUMENTS

| 3,028,284 | 4/1962 | Reeves | 264/328.7 |
| 3,671,159 | 6/1972 | Greenberg et al. | 425/552 |
| 4,091,057 | 5/1978 | Weber | 264/328.7 |
| 4,092,385 | 5/1978 | Balevski et al. | 264/328.7 |
| 4,176,447 | 12/1979 | Brennan | 264/136 |
| 4,188,463 | 2/1980 | Arcuri | 264/104 |
| 4,212,625 | 7/1980 | Shutt | 425/552 |
| 4,218,524 | 8/1980 | Dunn et al. | 429/104 |
| 4,294,005 | 10/1981 | Brennan | 264/105 |

FOREIGN PATENT DOCUMENTS

| 479517 | 2/1938 | United Kingdom . |
| 1345548 | 1/1974 | United Kingdom . |
| 1345892 | 2/1974 | United Kingdom . |

Primary Examiner—James H. Derrington
Attorney, Agent, or Firm—Beveridge, DeGrandi and Kline

[57] ABSTRACT

A cathode structure for a sodium sulphur cell is formed by putting a fibre matrix into a mould which is closed to shape the matrix to the required form with compression of the fibrous material, the mould being kept at a temperature below 12° C. and preferably between 8° and 10° C. while liquid sulphur is injected into the compressed fibre material.

15 Claims, 4 Drawing Figures

METHODS OF AND APPARATUS FOR MAKING CATHODE ELECTRODES FOR SODIUM SULPHUR CELLS

BACKGROUND OF THE INVENTION

1. Field of the Invention

This invention relates to methods of and apparatus for making cathode electrodes for sodium sulphur cells.

A cathode electrode structure for a sodium sulphur cell comprises a fibrous mass, typically of carbon or graphite felt material, which is impregnated initially with sulphur. Sodium sulphur cells commonly employ solid electrolyte material in tubular form which separates an anodic region containing the sodium from the cathodic region containing the fibrous material impregnated with the sulphur. This fibrous material extends between the surface of the electrolyte tube and the surface of a current collector and hence is generally of annular form. It may be on the inner surface of the electrolyte tube, between the inside surface of the tube and an axially located cylindrical current collector, or it may be between the outside surface of the electrolyte tube and an outer current collector, which is commonly a metallic housing for the cell. In each of these cases, the cathodic structure is of annular form. One convenient way of making such a cathodic structure is to compress the fibrous material in a mould, to impregnate the fibrous material with liquid sulphur either before compression or after compression in the mould, then to cool the material to solidify the sulphur, while the fibrous material is still under compression in the mould, so as to form a rigid structure which can then be inserted in the cell. When the cell is heated to the operating temperature, the sulphur melts and the compressed fibrous material will expand slightly to come into contact with the current collector and the electrolyte surface.

2. Prior Art

Britich Patent Specification No. 1472975 describes a cathode structure formed as an assemblage of part cylindrical segments which together will make up the required annulus. As described in U.S. Pat. Nos. 4,176,447 and 4,243,733, a flat sheet of fibrous material may be shaped into a number of trapezoidal section segments which can be put together to form an annular structure. These segments may be formed with webs joining adjacent segments so that the whole assembly filling an annulus is a unitary structure.

Heretofore, as described for example in the aforementioned U.S. Pat. No. 4,176,447, a heated mould has been used for compressing and shaping the material and, conveniently, the sulphur is injected into the mould after the material has been compressed therein. The mould is then cooled to solidify the sulphur so as thereby to form a rigid structure which may be removed from the mould. This successive heating and cooling of the mould inevitably results in a slow production rate. Because of a viscosity change in sulphur which occurs at 158° C., it is desirable to inject the sulphur at a temperature just below this e.g. at 148° C. If the temperature of the sulphur is increased above 158° C., then viscosity increases rapidly. If the temperature is decreased below 158° C., the viscosity increases but the rate of change of viscosity with temperature is much smaller in the region just below 158° C. than just above this temperature. It has always been assumed heretofore that the mould must be kept at a high temperature for injection, since the sulphur has to be forced into a fibrous matrix and it was believed that a cold mould would chill the sulphur and prevent it from properly impregnating the fibrous matrix. For this reason, it has always been considered necessary to heat and cool the mould in each cycle of operation as described above.

In the prior technique, it has been found that repetitive operation, using cyclic heating and cooling of the mould leads, after a short time, to the articles sticking to the mould.

BRIEF SUMMARY OF THE INVENTION

We have now found most surprisingly that if the mould is maintained at a temperature at or below 12° C. and preferably at a temperature between 6° and 12° C. and more preferably between 8° and 10° C., sticking of the formed component to the moulding tool is eliminated. The upper temperature limit is critical and, for example, at 13° C., sticking of the moulded component to the mould tool quickly arises in a production run.

Thus, according to one aspect of the present invention, a method of forming a cathode structure for a sodium sulphur cell comprises putting a fibre matrix into a closable mould, closing the mould to shape the matrix to a required form with compression of the fibrous material, closing the mould and injecting liquid sulphur into the closed mould to impregnate the fibrous material, the mould being kept at a temperature at or below 12° C. whilst the sulphur is injected. The sulphur rapidly solidifies when injected into the cold mould and the formed article may readily be removed, as a rigid structure, on opening the mould. There is no need to heat and cool the mould in each cycle of operation. The temperature control of the mould may be effected by passing a coolant fluid through channels in the mould structure.

Preferably the sulphur is injected substantially horizontally into the mould; this eliminates any dripping from the injection nozzle into the mould.

According to another aspect of the present invention, an apparatus for the manufacture of cathode structures for sodium sulphur cells comprises a closable mould for compressing a fibre matrix to the required shape of the structure, means for injecting hot sulphur into the mould containing the compressed matrix material and cooling means for maintaining the mould at a temperature of 12° C. or below. Preferably the cooling means are arranged to maintain the mould at a temperature in the range of 6° C. to 12° C. and more preferably in the range of 8° C. to 10° C. The cooling means for maintaining the mould at the required temperature may comprise means for circulating a coolant fluid through channels in the mould with means for maintaining the coolant fluid at the required temperature.

It has been found preferable to hard chrome-plate to a mirror finish the mould structure which can come in contact with the sulphur. Preferably also any other parts of the machine which may come in contact with the sulphur are hard chrome-plated.

The sulphur may be injected through a nozzle, preferably with a needle shut-off valve. This nozzle is preferably arranged horizontally to eliminate any dripping from the nozzle onto the mould. The nozzle is preferably maintained at a temperature above 158° C. The mould conveniently has a header into which the sulphur is injected and from which the sulphur flows into the fibrous material in the mould, the header providing a clear channel free of fibrous material for free flow of the sulphur.

For injecting the liquid sulphur, a plunger operating in a barrel may be provided: preferably the plunger operates vertically. There may be provided means for feeding powdered sulphur into the barrel containing the plunger and means for heating the barrel. The plunger may be arranged to force the molten sulphur through a temperature-controlled heating system into an injection nozzle. The temperature of the sulphur, in a practical system, will necessarily be slightly lower than the temperature of the injection system through which the sulphur is fed. The required temperatures for the feed system and the nozzle may be determined empirically and are arranged so that the sulphur leaving the nozzle is below 158° C. and typically is at a temperature just above 148° C.

The mould for moulding the cathode structure preferably comprises a base member, a shroud surrounding the base member to form parallel upstanding walls, the shroud being movable relative to the base member in a direction parallel to the walls and a closure member arranged to engage and seal against the shroud and to be movable with the shroud to compress the matrix material against the base member. Coolant channels may be provided in the closure member and/or in the shroud and/or in the base member for circulation of a coolant for maintaining the mould at the required temperature.

As previously mentioned, the surfaces of the mould which come into contact with the article to be moulded are preferably chrome-plated. The mould may be made of steel. Ejector pins may be provided in the base member for ejection of the moulded components. Injection of the sulphur is conveniently effected through an inlet channel in said shroud.

DESCRIPTION OF THE PREFERRED EMBODIMENT

Figure 1:
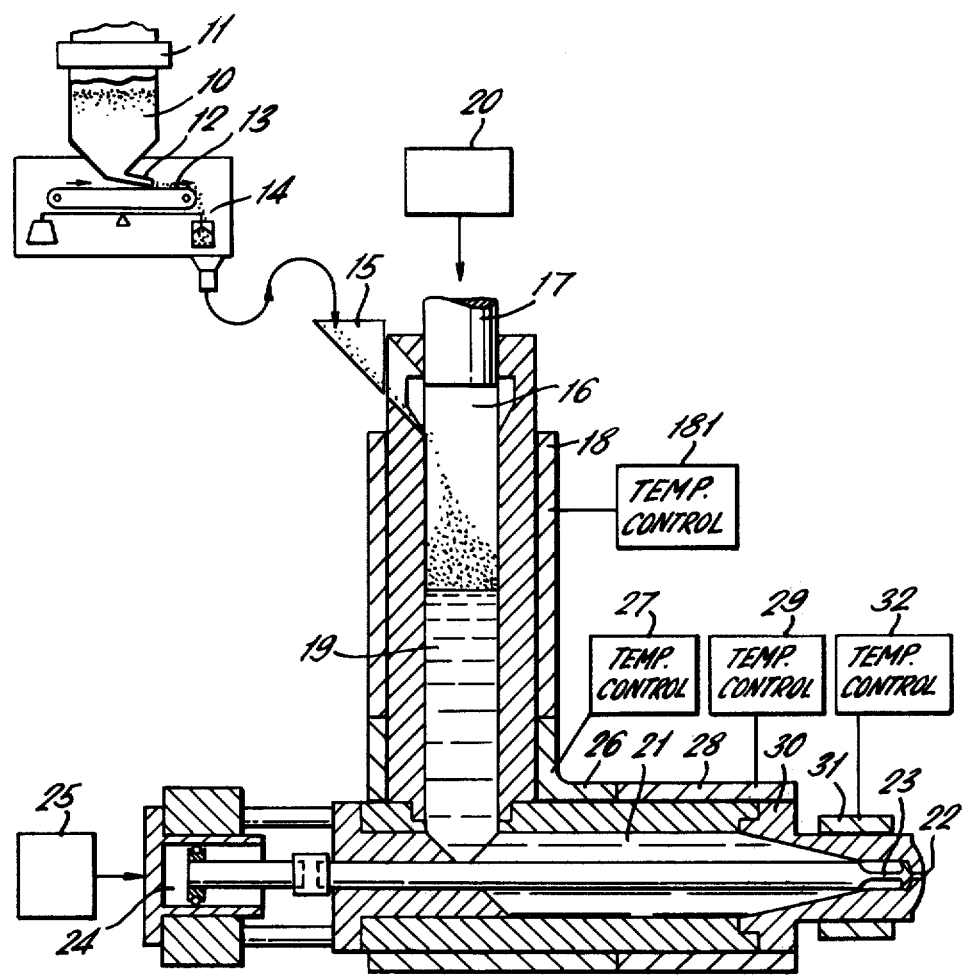
FIG. 1 is a diagrammatic elevation of sulphur ejection means for ejection of sulphur into a mould in one embodiment of the invention.

Referring to FIG. 1 there is shown diagrammatically a hopper 10 for containing powdered sulphur and having an automatic filler 11 and a vibratory feeder 12 for feeding the sulphur onto a conveyor belt 13 feeding metering means 14 for metering predetermined quantities of the sulphur into a chute 15 feeding the sulphur into the top of a vertical cylinder 16 having a plunger 17. This cylinder is heated, the major part of its length being heated by heating means 18 with a temperature controller 181 to maintain this region at a temperature of about 90° C. This causes the sulphur to melt in the cylinder, the molten sulphur, shown at 19, sinking to the bottom of the cylinder. The plunger 17 has restricted clearance within the cylinder to prevent the sulphur powder jamming the plunger in the cylinder. The vertical arrangement of the cylinder and plunger also assists in eliminating jamming of the plunger by the sulphur powder. The plunger 17 is driven downwards, by hydraulic operating means shown diagrammatically at 20, in each cycle for injecting sulphur into the mould, the plunger being retracted after the sulphur has been injected. Downward movement of the plunger forces the powdered sulphur downwardly and forces molten sulphur through the bottom end of the cylinder 16 into a horizontal passage 21 which terminates in a nozzle 22 having a needle-type control valve 23. The valve 23 is operated by means of a piston and cylinder 24 hydraulically controlled by control means shown diagrammatically at 25.

The lower part of the cylinder 16 and the adjacent region of the horizontal passage 21 is heated by heating means 26 which are thermostatically controlled by temperature-control means 27 to maintain this region at a temperature of about 155° C. Further heating means 28 extending along the remaining part of the horizontal passage 21 are controlled by temperature-control means 29 which are arranged to keep this part of the passage also at a temperature of about 155° C. The passage 21 is terminated by an internally tapered unit 30 with the outlet nozzle 22 at its end. This member 30 is heated by a heater 31 with temperature-control means 32 to maintain the nozzle at about 160° C. This latter temperature is above the temperature of viscosity change (158° C.) but the sulphur remains below that temperature and so is free-flowing at the nozzle. To ensure the accurate temperature control of the sulphur, all the temperature-controllers are three-term controllers and they are adjusted so that the sulphur is at the correct temperature before injection.

The injection valve 21 and nozzle 22 on their internal surfaces which come in contact with the sulphur are formed of steel with chrome plating to minimise sticking of the sulphur to the mechanical components of the injection assembly.

Figure 2:
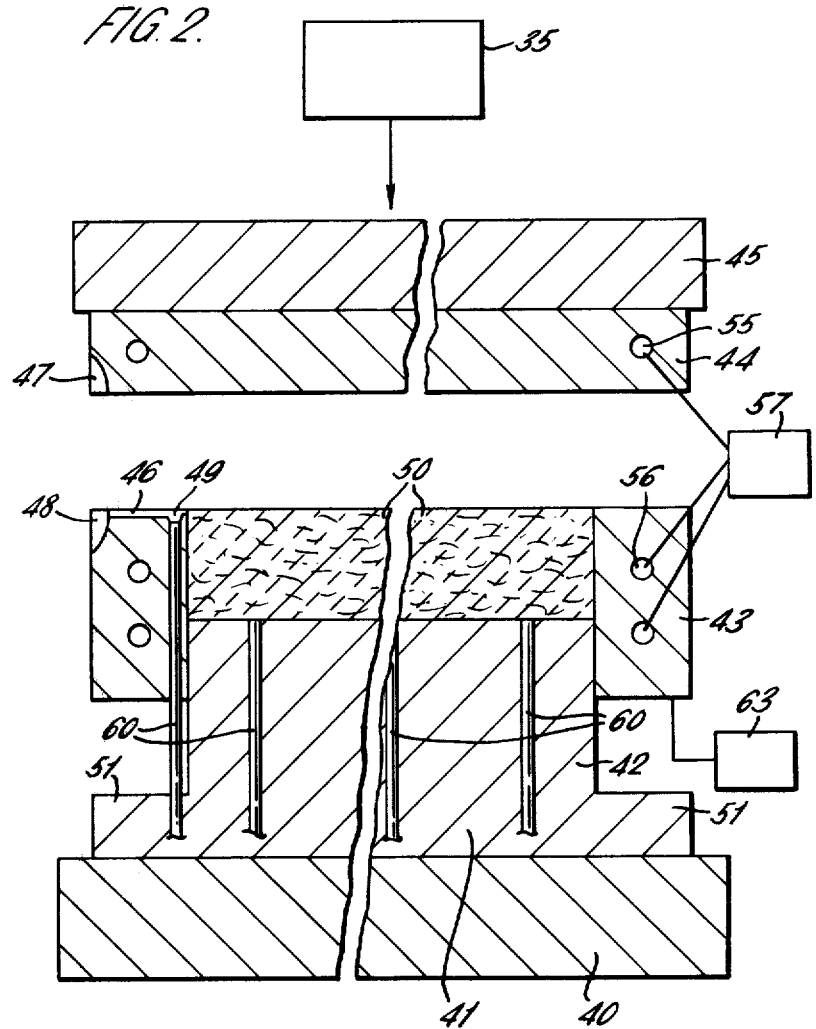
FIG. 2, to a larger scale than FIG. 1, is a section through a mould showing the mould loaded with fibre material at the start of a cycle.
Figure 3:
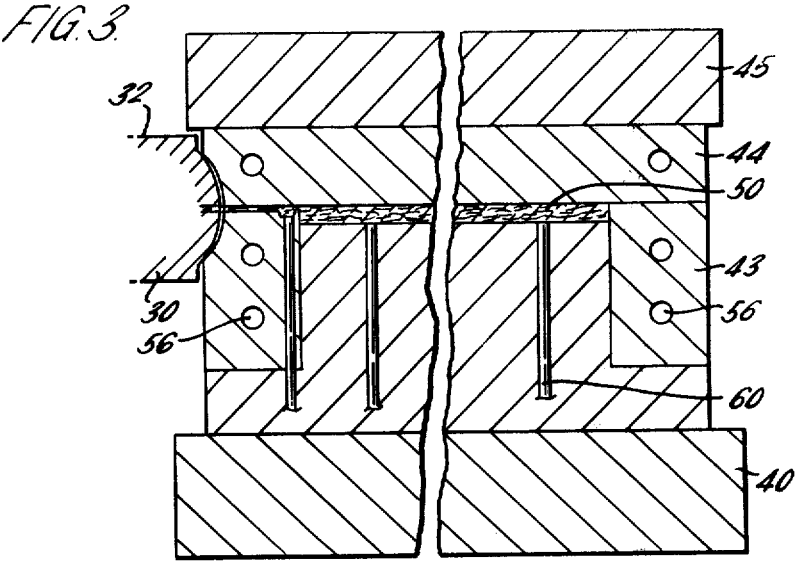
FIG. 3 shows the mould closed to compress the fibre material, the mould being in the ejection position for ejection of sulphur.
Figure 4:
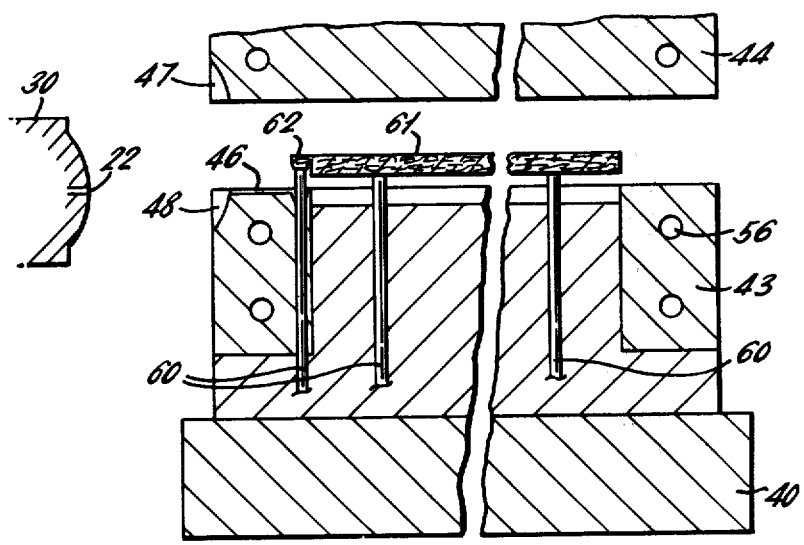
FIG. 4 is a section through the mould at the end of the cycle when the moulded article is being ejected.

The mould is illustrated in FIGS. 2, 3 and 4, which show the mould assembly diagrammatically at three stages in the cycle of operation. In these drawings, the mechanical details of the structure for opening and closing the mould have been omitted for simplicity. This opening and closing is conveniently effected by means of a hydraulic ram indicated diagrammatically at 35 in FIG. 2.

The mould comprises a platen 40 carrying a base member 41 which forms the base of the mould. This member 41 has an upstanding portion 42 of rectangular form with upright sides on which there fits a shroud 43 which is of generally rectangular form in horizontal section and which can slide vertically on the upstanding portion 42. This shroud 43 is initially in its uppermost position as shown in FIG. 2. The mould has a top closure 44 on a platen 45 which is operated by the aforementioned hydraulic ram 35. The top closure 44 engages with and seals against the upper surface of the shroud 43. This upper surface has a groove 46 forming an inlet passage for the molten sulphur. The groove 46 extends between depressions 47, 48 on the respective members 44, 43 which depressions are shaped to fit over the outer end of the nozzle member 30 and to seal thereagainst when the nozzle is presented to the mould, the depressions being shaped so that the nozzle 22 injects the sulphur directly into the groove 46. This groove 46 leads into a header 49 extending normal to the plane of the paper in FIGS. 2, 3 and 4 and which distributes the sulphur across the width of the assembly.

The mould is loaded by putting fibre material 50, e.g. carbon felt, into the region above the top surface of the portion 42 within the shroud 43 but not into the header 49. The loaded mould is shown in FIG. 2. When the mould is closed, the top closure 44 presses the shroud 43 downwardly onto shoulders 51 on the base portion 41 of the mould, so compressing the felt as shown in FIG. 3. The injection head is then moved horizontally by means of a hydraulic ram to bring the nozzle into contact with the mould. Sulphur is injected into the mould by opening injection valve 21 followed by downward movement of the plunger 17 in the cylinder 16 so that the felt 50 is impregnated with the sulphur.

Coolant passages 55 are provided in the top closure 44 and passages 56 in the shroud 43. Coolant passages may also be provided in the base member 41 if further temperature control is required. Through these passages, a coolant fluid is circulated to maintain the mould assembly at a temperature which is between 6° C. and 12° C. and is preferably between 8° C. and 10° C. This coolant circulation is indicated diagrammatically at 57 in FIG. 2. The mould is thus at a temperature well below the melting point of sulphur. Most surprisingly it has been found that, by using this low temperature, it is possible to eliminate sticking of the moulded component to the mould tool. This mould tool is made of steel which, on its moulding surface, is chrome-plated. Even with this chrome plating however it has been found that, on production runs, sticking of the moulded article to the mould tool occurs even at temperatures of 13° C. The use of the lower temperature eliminates this sticking.

After the sulphur has been injected, the top closure portion 44 of the mould is lifted and the moulded article is ejected by means of ejector pins 60, which are steel pins with a chrome-plating. As seen in FIG. 4, the moulded component remains a thin rigid component because the sulphur has solidified holding the fibrous material in compression. The component may be shaped as for example in the manner described in the aforementioned U.S. Pat. Nos. 4,176,447 and 4,243,733. This moulded component is shown at 61 and remains attached to a strip 62 of sulphur which was in the header 49. This strip 62 is joined to the component 61 by a thin web of sulphur and hence can readily be broken off.

In the cycle of operation, after the moulded component has been removed, the outer shroud 43 is lifted on the bottom section of the tool to the position shown in FIG. 1. This lifting may be effected hydraulically, as indicated diagrammatically at 63 in FIG. 2. This raises the shroud to the position for loading the fibrous material for moulding of the next component.

We claim:

1. An apparatus for the manufacture of cathode structures for sodium sulphur cells comprising a closable mould for compressing a fibre matrix to the required shape of the structure, means for heating sulphur to a temperature above its melting point, temperature controlled injection means for injecting liquid sulphur into the mould containing the compressed matrix material and cooling means for maintaining the mould at a temperature of 12° C. or beow, said injection means having a temperature controller operative to maintain the sulphur temperature above the melting point but below 158° C. and furthermore including a temperature-controlled nozzle with heating means arranged to maintain the temperature of sulphur leaving the nozzle between 148° C. and 158° C., said nozzle having a shut-off valve.

2. Apparatus as claimed in claim 1 wherein said cooling means are arranged to maintain the mould at a temperature in the range of 6° C. to 12° C.

3. Apparatus as claimed in claim 1 wherein said cooling means are arranged to maintain the mould at a temperature in the range of 8° C. to 10° C.

4. Apparatus as claimed in claim 1 wherein the cooling means for maintaining the mould at the required temperature comprise means for circulating a coolant fluid through channels in the mould with means for maintaining the coolant fluid at the required temperature.

5. Apparatus as claimed in claim 1 wherein the parts of the injection head and mould structure which come in contact with the sulphur are hard chrome-plated to a mirror finish.

6. Apparatus as claimed in claim 1 wherein the valve in the nozzle is a needle shut-off valve.

7. Apparatus as claimed in claim 1 wherein the nozzle is arranged horizontally.

8. Apparatus as claimed in claim 6 wherein temperature-controlled heating means are provided for heating the nozzle.

9. Apparatus as claimed in claim 1 wherein the mould has a header into which the sulphur is injected.

10. Apparatus as claimed in claim 1 wherein, for injecting the liquid sulphur, a plunger operating in a barrel is provided.

11. Apparatus as claimed in claim 10 wherein the plunger operates vertically.

12. Apparatus as claimed in claim 10 wherein means are provided for feeding particulate sulphur into the barrel containing the plunger and wherein means are provided for heating the barrel.

13. Apparatus as claimed in claim 1 wherein the mould for moulding the cathode structure comprises a base member, a shroud surrounding the base member to form parallel upstanding walls, the shroud being movable relative to the base member in a direction parallel to the walls and a closure member arranged to engage and seal against the shroud and to be movable with the shroud to compress the matrix material against the base member.

14. Apparatus as claimed in claim 13 wherein coolant channels are provided in the closure member and/or in the shroud and/or in the base member for circulation of a coolant for maintaining the mould at the required temperature.

15. Apparatus as claimed in claim 14 and having an inlet to the mould for injection of the sulphur through a channel in said shroud.

* * * * *